United States Patent
Aoki et al.

(10) Patent No.: US 10,498,265 B2
(45) Date of Patent: Dec. 3, 2019

(54) MOTOR DRIVE CONTROL DEVICE AND MOTOR DRIVE CONTROL METHOD

(71) Applicant: MINEBEA MITSUMI Inc., Nagano (JP)

(72) Inventors: Masato Aoki, Iwata (JP); Hiroyuki Kaidu, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 15/969,881

(22) Filed: May 3, 2018

(65) Prior Publication Data
US 2018/0337618 A1  Nov. 22, 2018

(30) Foreign Application Priority Data
May 19, 2017  (JP) .................... 2017-100294

(51) Int. Cl.
| | |
|---|---|
| H02H 7/09 | (2006.01) |
| H02P 6/12 | (2006.01) |
| H02P 29/024 | (2016.01) |
| H02P 6/24 | (2006.01) |
| H02P 6/17 | (2016.01) |
| H02P 6/08 | (2016.01) |

(52) U.S. Cl.
CPC .............. *H02P 6/12* (2013.01); *H02P 6/08* (2013.01); *H02P 6/17* (2016.02); *H02P 6/24* (2013.01); *H02P 29/027* (2013.01); *H02P 29/0241* (2016.02)

(58) Field of Classification Search
CPC ........ H02P 20/024; H02P 29/027; H02P 6/12; H02P 6/24
See application file for complete search history.

(56) References Cited

U.S. PATENT DOCUMENTS

| | | | | |
|---|---|---|---|---|
| 4,842,087 A | * | 6/1989 | Morishita | B62D 5/0469 180/404 |
| 2006/0016427 A1 | * | 1/2006 | Uda | F02D 9/1095 123/399 |
| 2018/0223582 A1 | * | 8/2018 | Shin | F25D 23/028 |

FOREIGN PATENT DOCUMENTS

| | | |
|---|---|---|
| JP | 2002-354874 A | 12/2002 |
| JP | 2004-140962 A | 5/2004 |

(Continued)

OTHER PUBLICATIONS

Japanese Office Action dated Oct. 25, 2019 for corresponding Japanese Application No. 2017-100294 and English translation.

*Primary Examiner* — Karen Masih
(74) *Attorney, Agent, or Firm* — Pearne & Gordon LLP

(57) ABSTRACT

Provided is a motor drive control device capable of accurately and speedily detecting an abnormal condition of a motor. When the motor is started, the control circuit section determines the commanded rotational speed in accordance with an actual rotational speed calculated based on the position signal, the control circuit section determines whether or not the motor is in an abnormal condition based on a predetermined determination condition for a predetermined period, upon determining that the motor is in the abnormal condition, the control circuit section outputs the drive control signal to the motor drive section to stop the motor, and the abnormal condition includes a reversely rotating state. In the reversely rotating state the motor rotating in a direction opposite to a rotating direction when the motor is successfully started.

8 Claims, 10 Drawing Sheets

(56) References Cited

FOREIGN PATENT DOCUMENTS

| | | | |
|---|---|---|---|
| JP | 2008-289248 | A | 11/2008 |
| JP | 2011-050204 | A | 3/2011 |
| JP | 2011-105155 | A | 6/2011 |

* cited by examiner

MOTOR DRIVE CONTROL DEVICE AND MOTOR DRIVE CONTROL METHOD

CROSS REFERENCE TO RELATED APPLICATIONS

This application claims the benefit of Japanese Patent Application No. 2017-100294, filed May 19, 2017, which is hereby incorporated by reference in its entirety.

BACKGROUND

Technical Field

The present disclosure relates to a motor drive control device and a motor drive control method, and more particularly, to a motor drive control device and a motor drive control method capable of performing so-called one-sensor drive.

Background

Some motor drive control devices controlling driving of a motor drive the motor using a so-called one-sensor drive. For example, such motor drive control devices drive the motor using only one hall sensor for detecting a magnetic pole position of the motor.

When a motor is driven through a one-sensor drive, unlike when a plurality of sensors are used, it is not possible to specify a magnetic pole position.

Japanese Patent Application Laid-Open No. 2004-140962 describes a configuration of a fan motor drive control device using only one magnetic pole position detection sensor for a rotor. The fan motor drive control device performs braking control before starting a brushless motor and based on an output signal of a magnetic pole position detection sensor, by performing PWM energization to one switching element on one of positive and negative voltage sides of an inverter circuit and two switching elements on the other voltage side and positioning the rotor at a predetermined position.

In a one-sensor drive, trouble may occur when an external load is added to a rotating shaft of the motor before driving, causing an abnormal condition such as a situation in which the rotating shaft is rotated in reverse.

A more specific example will be described. A load causing reverse rotation of a fan may be placed on a fan motor forcing the fan motor to rotate in reverse. For example, depending on an operating environment, an undriven fan motor may be forced to rotate in a direction opposite to a commanded rotation direction due to strong outside wind. Furthermore, with a device provided with a plurality of fan motors, a difference between pressure inside and outside of the device may increase under the influence of another fan motor being driven and the undriven fan motor may be forced to rotate in reverse. When such a reversely rotating motor is started, the rotating shaft cannot be rotated normally with the torque upon starting and the state in which the fan motor is forced to rotate in reverse may continue as is.

When the motor is in such an abnormal condition, no problem may occur if the abnormal condition can be detected and starting of the motor can be stopped, but the one-sensor drive system may be unable to detect such an abnormal condition.

The present disclosure is related to providing a motor drive control device and a motor drive control method capable of accurately and speedily detecting an abnormal condition of a motor.

SUMMARY

In accordance with one aspect of the present disclosure, a motor drive control device includes a motor drive section selectively energizing coils with a plurality of phases of a motor, a control circuit section outputting a drive control signal generated based on an internally determined commanded rotational speed to the motor drive section to control operation of the motor drive section, and a position detector corresponding to any one of the plurality of phases and outputting a position signal, a phase of the position signal changing in correspondence with a position of a rotor of the motor, wherein, when the motor is started, the control circuit section determines the commanded rotational speed in accordance with an actual rotational speed calculated based on the position signal, the control circuit section determines whether or not the motor is in an abnormal condition based on a predetermined determination condition for a predetermined period, upon determining that the motor is in the abnormal condition, the control circuit section outputs the drive control signal to the motor drive section to stop the motor, and the abnormal condition includes a reversely rotating state. In the reversely rotating state the motor rotates in a direction opposite to a rotating direction when the motor is successfully started.

Preferably, the abnormal condition includes a hunting condition.

Preferably, the predetermined determination condition includes the motor being in an overcurrent condition.

Preferably, the control circuit section determines whether or not the motor is in an overcurrent condition based on a comparison result between a current flowing through the motor and a first current threshold after the motor is started and before a first timing when a first predetermined time elapses and the control circuit section determines whether or not the motor is in an overcurrent condition based on a comparison result between a current flowing through the motor and a second current threshold smaller than the first current threshold after the first timing.

Preferably, the predetermined period is a period from the first timing to a second timing, and the control circuit section determines whether or not the motor is in an overcurrent condition based on the comparison result between the current flowing through the motor and the second current threshold for the predetermined period.

Preferably, the control circuit section determines whether or not the motor is in an overcurrent condition based on the number of times the current flowing through the motor reaches the second current threshold for the predetermined period.

Preferably, the control circuit section determines whether or not the motor is in an overcurrent condition based on a comparison result between a current flowing through the motor and a third current threshold greater than the second current threshold after the second timing.

Preferably, the predetermined determination condition includes whether or not the actual rotational speed is less than a first rotational speed threshold for the predetermined period.

Preferably, when the motor is started, the control circuit section determines the commanded rotational speed to be an input commanded rotational speed input to the control circuit section when the actual rotational speed is slower than a second rotational speed threshold, and the control circuit section determines the commanded rotational speed to be a set rotational speed which is set in advance when the actual rotational speed is equal to or faster than the second rotational speed threshold.

Preferably, when the control circuit section does not determine that the motor is in an abnormal condition, the control circuit section determines the commanded rotational speed to be the input commanded rotational speed input to the control circuit section to control the motor drive section.

Preferably, the control circuit section includes a current monitoring section monitoring a current flowing through the motor and outputting motor current information, a rotational speed monitoring section outputting actual rotational speed information based on the position signal, a condition determination section determining whether or not the motor is in an abnormal condition based on the motor current information and the actual rotational speed information and outputting determination information, a rotational speed control section generating a drive command signal based on the determination information and the commanded rotational speed determined in accordance with the actual rotational speed information and outputting the drive command signal and a motor control section outputting a drive control signal based on the drive command signal.

In accordance with another aspect of the present disclosure, a method of controlling driving of a motor using a motor drive control device is provided, the motor drive control device including a motor drive section selectively energizing coils with a plurality of phases of a motor, a control circuit section outputting a drive control signal generated based on an internally determined commanded rotational speed to the motor drive section to control operation of the motor drive section, and a position detector corresponding to any one of the plurality of phases and outputting a position signal, a phase of the position signal changing in correspondence with a position of a rotor of the motor, the method including, when the motor is started, determining the commanded rotational speed in accordance with an actual rotational speed calculated based on the position signal, determining whether or not the motor is in an abnormal condition based on a predetermined determination condition for a predetermined period, and upon determining that the motor is in the abnormal condition, outputting the drive control signal to the motor drive section to stop the motor, wherein the abnormal condition includes a reversely rotating state. In the reversely rotating state the motor rotates in a direction opposite to a rotating direction when the motor is successfully started.

According to these disclosures, it is possible to provide a motor drive control device and a motor drive control method capable of accurately and speedily detecting an abnormal condition of a motor.

DETAILED DESCRIPTION

Hereinafter, a motor drive control device according to an embodiment of the present disclosure will be described.

Embodiments

Figure 1:
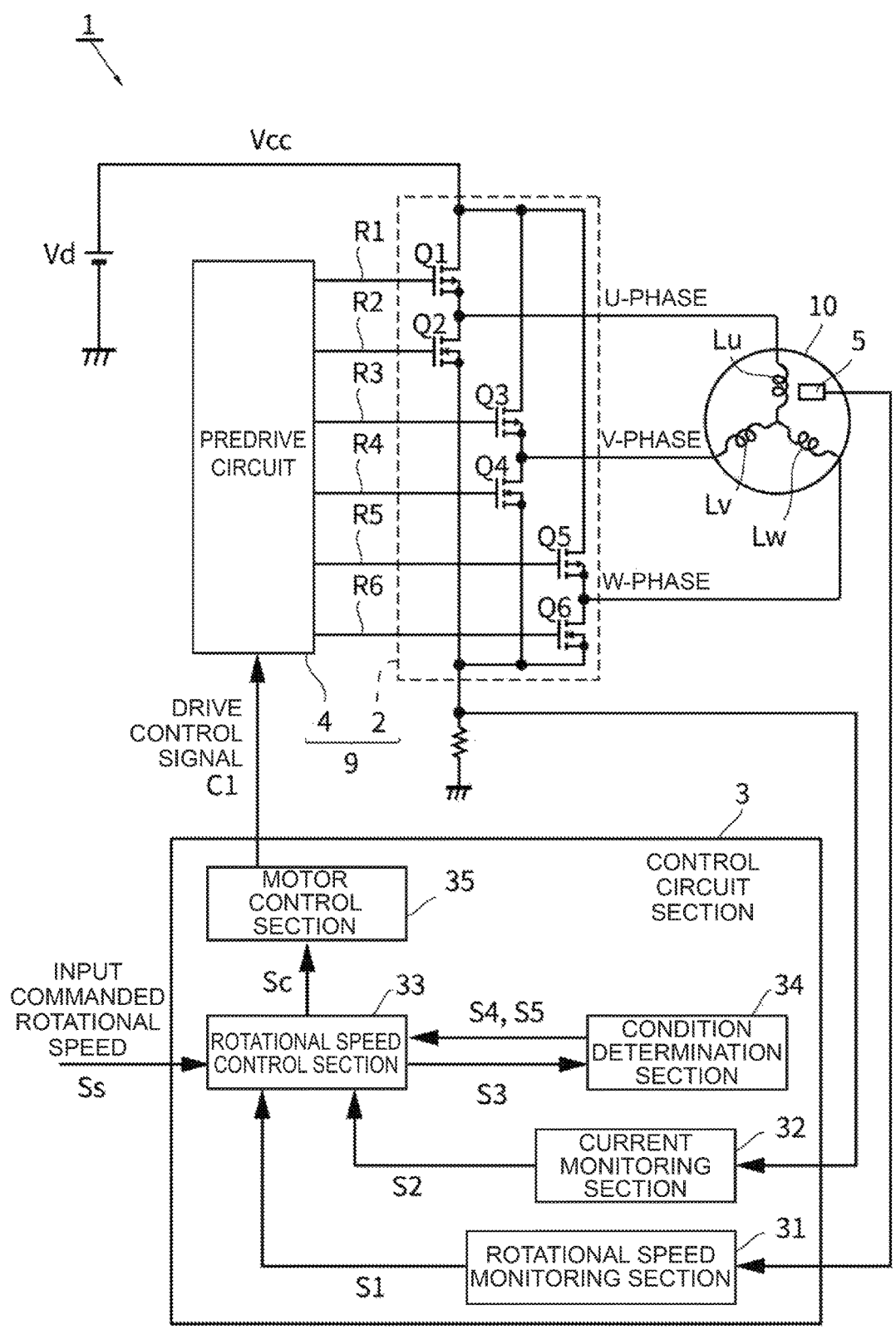
FIG. 1 is a diagram illustrating a configuration of a motor drive control device according to one embodiment of the present disclosure.

FIG. 1 is a diagram illustrating a configuration of a motor drive control device 1 according to one embodiment of the present disclosure.

As is shown in FIG. 1, the motor drive control device 1 is provided with a control circuit section 3, a position detector 5 and a motor drive section 9. The motor drive control device 1 supplies drive power to a synchronization motor (an example of motor) 10 to drive the synchronization motor 10. Note that the synchronization motor 10 according to the present embodiment is a three-phase motor having U-phase, V-phase and W-phase coils Lu, Lv and Lw.

The position detector 5 corresponds to any one of the plurality of phases of the synchronization motor 10 and outputs a position signal. The phase of the position signal changes in correspondence with a position of a rotor of the synchronization motor 10. More specifically, the position detector 5 is a magnetic sensor such as a hall element or a hall IC, and outputs a hall signal as a position signal. The position signal output from the position detector 5 is input to the control circuit section 3. The position detector 5 detects the position of the rotor at one location of the synchronization motor 10 and outputs the position signal. For example, one position detector 5 is provided for the U-phase coil Lu. When the rotor passes through a predetermined position while making one rotation (when the rotor is located at a first rotation position), the position signal is changed from low to high (rise; rising edge), and when the rotor passes through a different predetermined position (when the rotor is located at a second rotation position), the position signal is returned from high to low (fall; falling edge). The position signal is a signal periodically becoming high or low as the rotor rotates. The position detector 5 corresponds to any one of the U-phase, V-phase and W-phase of the synchronization motor 10. That is, the first rotation position and the second rotation position are positions corresponding to any one phase of the synchronization motor 10. The position signal is a signal, a phase of which changes according to the position of the rotor, that is, a position relationship between any one phase of the synchronization motor 10 and the rotor. Note that as the position signal, a signal periodically repeating high or low may be output directly from the position detector 5 or an analog position signal output from the position detector 5 may be input to the control circuit section 3 and then converted to a signal periodically becoming high or low (a signal following the conversion of the analog position signal in this way is also referred to as a "position signal" in the following description).

In the present embodiment, only one position detector 5 is provided. That is, a position signal detected at only one location of the synchronization motor 10 is input to the control circuit section 3. Note that a plurality of position detectors 5, each of which corresponds to one of the plurality of phases, may be provided and a position signal output from only one position detector 5 may be input to the control circuit section 3 and used. That is, in the present embodiment, a position signal output from one position detector 5 is input to the control circuit section 3. The motor drive control device 1 drives the synchronization motor 10 according to a one-sensor system using only one position detector 5 for detecting the position of the rotor.

The motor drive section 9 selectively energizes the coils Lu, Lv and Lw with the plurality of phases of the synchronization motor 10. The motor drive section 9 includes an inverter circuit 2 and a predrive circuit 4. The motor drive section 9 receives a drive control signal C1 output from the control circuit section 3.

The inverter circuit 2 selectively energizes the three-phase coils Lu, Lv and Lw of the synchronization motor 10 based on six types of drive signals R1 to R6 output from the predrive circuit 4 and controls rotation of the synchronization motor 10.

In the present embodiment, the inverter circuit 2 is provided with six switching elements Q1 to Q6 to supply a drive current to each of the coils Lu, Lv and Lw of the synchronization motor 10. The switching elements Q1, Q3 and Q5 are high-side switching elements composed of P-channel MOSFETs (metal-oxide-semiconductor field effect transistors) arranged on the positive pole side of a DC power supply Vcc. The switching elements Q2, Q4 and Q6 are low-side switching elements composed of N-channel MOSFETs arranged on the negative pole side of the DC power supply Vcc. In a combination of the switching elements Q1 and Q2, a combination of the switching elements Q3 and Q4 and a combination of the switching elements Q5 and Q6, the two respective switching elements are connected in series to each other. These three sets of series circuits are connected in parallel to each other to form a bridge circuit. A connection point of the switching elements Q1 and Q2 is connected to the U-phase coil Lu, a connection point of the switching elements Q3 and Q4 is connected to the V-phase coil Lv and a connection point of the switching elements Q5 and Q6 is connected to the W-phase coil Lw.

The predrive circuit 4 is provided with a plurality of output terminals connected to respective gate terminals of the six switching elements Q1 to Q6 of the inverter circuit 2. Drive signals R1 to R6 are output from the respective output terminals to control ON/OFF operations of the switching elements Q1 to Q6. The drive control signal C1 output from the control circuit section 3 is input to the predrive circuit 4. The predrive circuit 4 outputs the drive signals R1 to R6 based on the drive control signal C1 to cause the inverter circuit 2 to operate. That is, the inverter circuit 2 selectively energizes each phase coil Lu, Lv or Lw of the synchronization motor 10 based on the drive control signal C1.

The control circuit section 3 outputs the drive control signal C1 generated based on the commanded rotational speed internally determined as will be described later to the motor drive section 9 to thereby control operation of the motor drive section 9. The control circuit section 3 outputs the drive control signal C1 to the motor drive section 9 to thereby change the energization phase of the coils Lu, Lv and Lw with the plurality of phases in a predetermined order.

The control circuit section 3 can be constructed using a programmable device, for example, a DSP (digital signal processor), an FPGA (field programmable gate array) or a microcomputer, but the control circuit section 3 is not limited to such devices. Although details will be described later, when starting the synchronization motor 10, the control circuit section 3 determines the commanded rotational speed in accordance with the actual rotational speed calculated based on the position signal, determines whether or not the synchronization motor 10 is in an abnormal condition based on a predetermined determination condition during a predetermined period, and upon determining that the synchronization motor 10 is in an abnormal condition, the control circuit section 3 outputs the drive control signal C1 to the motor drive section 9 and thereby performs control so as to stop the synchronization motor 10.

The control circuit section 3 includes a rotational speed monitoring section 31, a current monitoring section 32, a rotational speed control section 33, a condition determination section 34 and a motor control section 35.

The rotational speed monitoring section 31 receives a position signal output from the position detector 5. The rotational speed monitoring section 31 outputs actual rotational speed information S1 based on the position signal. The actual rotational speed information S1 represents an actual rotational speed corresponding to the actual rotational speed of the synchronization motor 10.

The current monitoring section 32 monitors a current flowing through the synchronization motor 10 and outputting motor current information S2. The motor current information S2 represents magnitude of a coil current flowing through the coil Lu, Lv or Lw of the synchronization motor 10.

The rotational speed control section 33 generates and outputs a drive command signal Sc based on determination information S5 and the actual rotational speed information S1. The rotational speed control section 33 receives the actual rotational speed information S1. The rotational speed control section 33 also receives the motor current information S2. The rotational speed control section 33 also receives an input commanded rotational speed Ss from outside. The rotational speed control section 33 outputs condition information S3 about the synchronization motor 10 to the condition determination section 34. The condition information S3 includes, for example, the actual rotational speed information S1, the motor current information S2 and the drive command signal Sc. The rotational speed control section 33 receives timing information S4 and the determination information S5 output from the condition determination section 34.

The condition determination section 34 determines whether or not the synchronization motor 10 is in an abnormal condition based on the condition information S3 and outputs the determination information S5. The condition determination section 34 receives the condition information S3 output from the rotational speed control section 33. An overcurrent threshold for determining the overcurrent condition (first current threshold, second current threshold, third current threshold) and a rotational speed threshold (first rotational speed threshold, second rotational speed threshold) for determining the rotational speed are set in the condition determination section 34. The condition determination section 34 can count timing by counting, for example, a clock signal. The condition determination section 34 determines whether or not the synchronization motor 10 is in an abnormal condition as will be described later. The condition determination section 34 then outputs the determination information S5 corresponding to the determination result and the timing information S4.

The motor control section 35 outputs the drive control signal C1 based on the drive command signal Sc. That is, the motor control section 35 generates the drive control signal C1 based on the drive command signal Sc and outputs the generated drive control signal C1 to the predrive circuit 4 of the motor drive section 9.

Next, operation of the motor drive control device 1 will be described. Upon starting the synchronization motor 10, the motor drive control device 1 roughly adjusts energization timing, performs one-sensor drive and then moves to normal drive.

The motor drive control device 1 performs forcible commutation of the synchronization motor 10 upon starting the synchronization motor 10. Upon starting the synchronization motor 10, the motor drive control device 1 adjusts energization timing. That is, the control circuit section 3 adjusts an energization phase based on the position signal upon starting the synchronization motor 10 and thereby adapts the change timing of the phase of the position signal to the energization phase. That is, the control circuit section 3 synchronizes the rotation of the rotor of the synchronization motor 10 and the energization timing of each energization phase. The motor drive control device 1 performs one-sensor drive (normal drive of the synchronization motor 10 according to the one-sensor system). That is, the control circuit section 3 outputs the drive control signal C1 according to the cycle of the position signal (starts normal drive). In this way, the control circuit section 3 switches among the energization phases of the coils Lu, Lv and Lw energized by the motor drive section 9 in predetermined order.

Here, in the present embodiment, upon starting the synchronization motor 10, the control circuit section 3 performs a process of determining the commanded rotational speed according to the actual rotational speed calculated based on the position signal as will be described later. Furthermore, the control circuit section 3 performs a process of determining whether or not the synchronization motor 10 is in an abnormal condition based on a predetermined determination condition. Upon determining that the synchronization motor 10 is in an abnormal condition, the control circuit section 3 outputs the drive control signal C1 to the motor drive section 9 and thereby performs control for stopping the synchronization motor 10.

Note that the abnormal condition in the present embodiment includes a reverse rotation condition in which the rotor rotates in a direction opposite to the rotating direction upon successful starting of the synchronization motor 10.

Furthermore, the abnormal condition may also include a condition in which the synchronization motor 10 is in a hunting condition. The hunting condition refers to a condition in which when there is a drive command for driving the motor, the rotor of the motor does not rotate in a forward direction farther than a specific rotation position but repeats a reciprocating rotation operation between the specific rotation position and a position in front of the specific rotation position, not leading to a complete stop of the motor. For example, the motor is in a hunting condition when a driven object such as a fan is driven to rotate by the motor, the driven object is rotated in a forward direction and comes to hit an obstacle or the like when it reaches a specific rotation position, the driven object is slightly reversely rotated by a reaction, and is rotated by a drive force of the motor in the forward direction again until it hits an obstacle, thus repeating such forward and backward rotations.

That is, the control circuit section 3 in the present embodiment determines whether or not the synchronization motor 10 is in a hunting condition or a reverse rotation condition based on a predetermined determination condition. Upon determining that the synchronization motor 10 is in a hunting condition or a reverse rotation condition, the control circuit section 3 causes the synchronization motor 10 to stop. The rotational speed control section 33 outputs the drive command signal Sc to execute a command for stopping energization, and the motor control section 35 thereby outputs the drive control signal C1 to the motor drive section 9. Note that the abnormal condition in the present embodiment includes at least a reverse rotation condition of the rotor, but whether or not a hunting condition is included as a detection target is not particularly limited.

In the present embodiment, the predetermined determination condition includes a condition relating to the magnitude of a current flowing through the synchronization motor 10. More specifically, the predetermined determination condition includes whether or not the synchronization motor 10 is in an overcurrent condition.

Furthermore, the predetermined determination condition includes a condition relating to the magnitude of the actual rotational speed for a predetermined period. More specifically, the predetermined determination condition includes whether or not the actual rotational speed is less than a first rotational speed threshold for a predetermined period. The predetermined period is, for example, a period from a first timing T1 (timing at which the first predetermined time elapses from the start of the synchronization motor 10) to a second timing T2 (timing at which the first predetermined time elapses from the start of the synchronization motor 10 and a second predetermined time further elapses). That is, the predetermined determination condition includes whether the actual rotational speed is less than the first rotational speed threshold from the first timing T1 to the second timing T2.

For a period from the first timing T1 to the second timing T2 (an example of the predetermined period), if the synchronization motor 10 is in an overcurrent condition and the actual rotational speed of the synchronization motor 10 is less than a predetermined value (less than the first rotational speed threshold), the condition determination section 34 in the control circuit section 3 determines that the synchronization motor 10 is in an abnormal condition. That is, when the synchronization motor 10 is in an overcurrent condition for a predetermined period and the actual rotational speed of the synchronization motor 10 is less than a predetermined value, the control circuit section 3 determines that the predetermined determination condition is satisfied (a predetermined stop condition is established). When the synchronization motor 10 is in an overcurrent condition and the actual rotational speed of the synchronization motor 10 is less than a predetermined value, the control circuit section 3 performs control to stop the synchronization motor 10.

Whether or not the synchronization motor 10 is in an overcurrent condition is determined as follows. The control circuit section 3 determines whether or not the synchronization motor 10 is in an overcurrent condition based on the comparison result between the current flowing through the synchronization motor 10 and the first current threshold after starting the synchronization motor 10 until before the first timing T1. Furthermore, the control circuit section 3 determines whether or not the synchronization motor 10 is in an overcurrent condition based on the comparison result between the current flowing through the synchronization motor 10 and a second current threshold smaller than the first current threshold after the first timing T1. In this case, more specifically, the control circuit section 3 determines whether or not the synchronization motor 10 is in an overcurrent condition based on the comparison result between the current flowing through the synchronization motor 10 and the second current threshold from the first timing T1 to the second timing T2. The control circuit section 3 determines whether or not the synchronization motor 10 is in an overcurrent condition based on the comparison result between the current flowing through the synchronization motor 10 and a third current threshold greater than the second current threshold after the second timing T2. These determinations are made, for example, by the condition determination section 34.

In the present embodiment, for the period from the first timing T1 to the second timing T2, if the number of times the current flowing through the synchronization motor 10 reaches the second current threshold is greater than a predetermined number of times, the condition determination section 34 determines that the synchronization motor 10 is in an overcurrent condition. The condition determination section 34 counts the number of times the current flowing through the synchronization motor 10 reaches the second current threshold using an overcurrent counter and makes the above-described determination. In other words, for the period from the first timing T1 to the second timing T2, even when the current flowing through the synchronization motor 10 reaches the second current threshold, the condition determination section 34 does not necessarily determine that the synchronization motor 10 is in an overcurrent condition.

Figure 2:
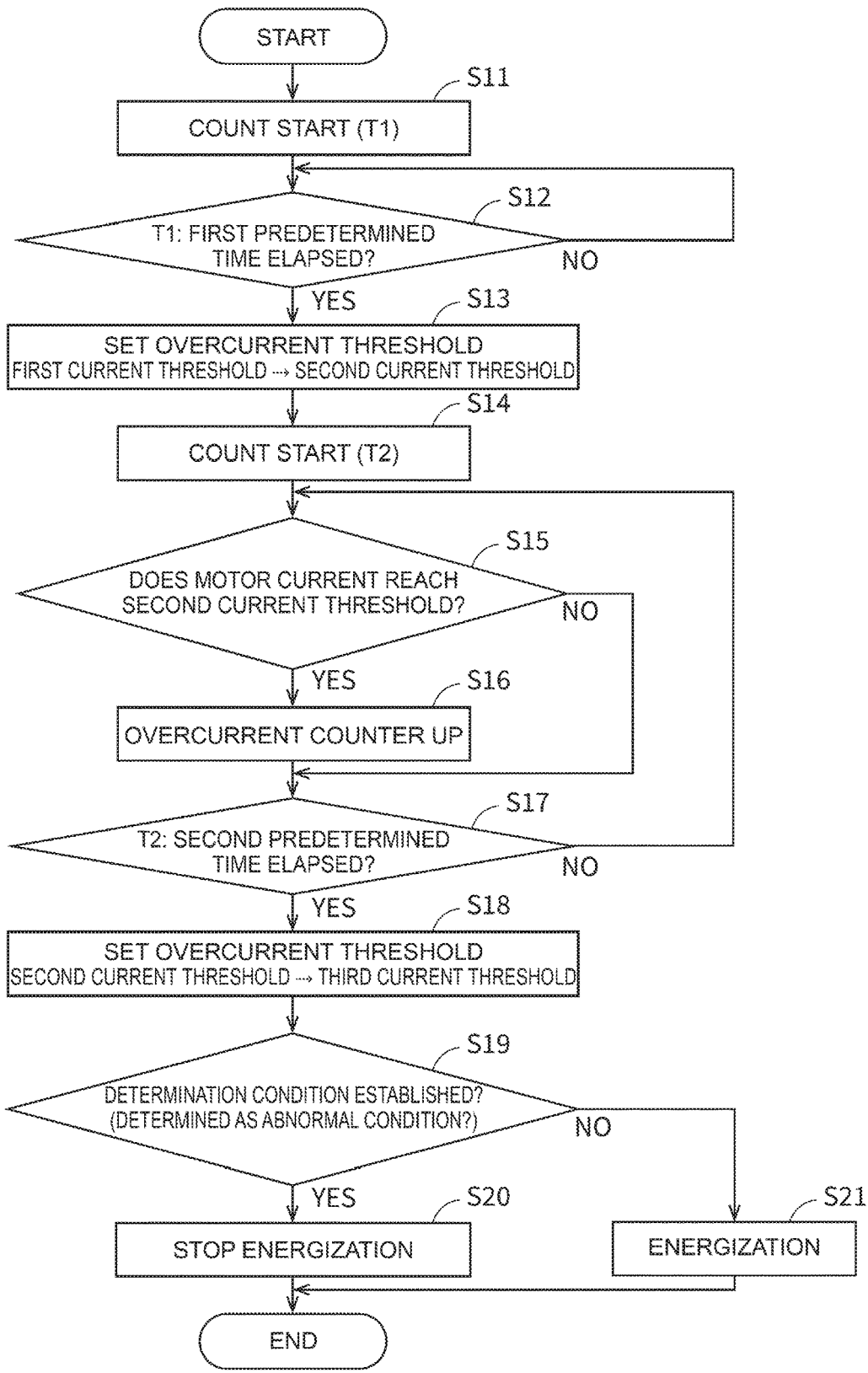
FIG. 2 is a flowchart describing operation of a control circuit section carried out when a synchronization motor is started.

FIG. 2 is a flowchart describing operation of the control circuit section 3 carried out upon starting the synchronization motor 10.

As shown in FIG. 2, upon starting the synchronization motor 10, the condition determination section 34 in the control circuit section 3 starts counting to measure the first timing T1 in step S11.

In step S12, the condition determination section 34 determines whether or not a first predetermined time elapses after the counting starts. That is, whether or not the first predetermined time elapses (whether or not the first timing T1 arrives) after the synchronization motor 10 is started. If the first predetermined time has elapsed (YES), the flow proceeds to step S13. If the first predetermined time has not elapsed (NO), the operation in step S12 is repeated in a constant cycle.

Note that if the current flowing through the synchronization motor 10 reaches the first current threshold before the first timing T1 arrives, the condition determination section 34 determines that the synchronization motor 10 is in an overcurrent condition. In this case, the condition determination section 34 determines that the synchronization motor 10 is in an abnormal condition. Thus, the control circuit section 3 performs control to stop energization to the synchronization motor 10.

In step S13, the condition determination section 34 sets an overcurrent threshold to determine the overcurrent condition for a period (predetermined period) from the first timing T1 to the second timing T2. That is, in the present embodiment, the overcurrent threshold is changed from the first current threshold to the second current threshold lower than the first current threshold.

In step S14, the condition determination section 34 starts counting to measure the second timing T2.

In step S15, the condition determination section 34 determines whether or not the current flowing through the synchronization motor 10 reaches the second current threshold.

The flow proceeds to step S16 when the current reaches the second current threshold, while the flow proceeds to step S17 when the current does not reach the second current threshold.

In step S16, the condition determination section 34 increments the overcurrent counter (overcurrent counter-up). Note that at this time, the control circuit section 3 temporarily stops energization to the motor.

In step S17, the condition determination section 34 determines whether or not the second predetermined time elapses after starting the timing counting. That is, after the first predetermined time elapses after starting the synchronization motor 10, the condition determination section 34 determines whether or not the second predetermined time further elapses (whether or not the second timing T2 arrives). When the second predetermined time elapses (YES), the flow proceeds to step S18. When the second predetermined time does not elapse (NO), energization to the motor is performed and the process from step S15 is performed. The process from step S15 may be performed, for example, in a constant cycle (e.g., 2 milliseconds).

In step S18, the condition determination section 34 sets an overcurrent threshold (third current threshold) after the second timing T2. The third current threshold is set to a value greater than the second current threshold as an overcurrent threshold assuming a condition in which the synchronization motor 10 is constantly driving. Note that in the present embodiment, the third current threshold is changed so as to have the same value as the original first current threshold (see FIG. 6 and subsequent figures), as a specific example. However, the third current threshold need not always have the same value as the first current threshold. Note that the process in step S18 may not necessarily be limited to this order, but may be executed after steps S20 and S21.

In step S19, as will be described later, the condition determination section 34 determines whether or not the predetermined determination condition is satisfied for the period from the first timing T1 to the second timing T2, that is, whether or not a predetermined stop condition is established. When the determination condition is established, the determination information S5 corresponding to the determination result is output from the condition determination section 34 and the flow proceeds to step S20. On the other hand, when the determination condition is not established, the determination information S5 to that effect is output, and the flow proceeds to step S21.

In step S20, the rotational speed control section 33 receives the determination information S5 output from the condition determination section 34 corresponding to the fact that the determination condition is established. The rotational speed control section 33 then outputs the drive command signal Sc so as to stop energization to the synchronization motor 10. Thus, the drive control signal C1 is output from the motor control section 35 and driving of the synchronization motor 10 is stopped.

In step S21, the rotational speed control section 33 outputs the drive command signal Sc so as to perform energization to the synchronization motor 10 based on the commanded rotational speed and the actual rotational speed determined as will be described later.

Note that when the operation in step S21 is performed and driving of the synchronization motor 10 is then performed continuously, if the current flowing through the synchronization motor 10 reaches the third current threshold (the same value as the first current threshold in the present embodiment), the condition determination section 34 determines that the synchronization motor 10 is in an overcurrent condition.

Figure 3:
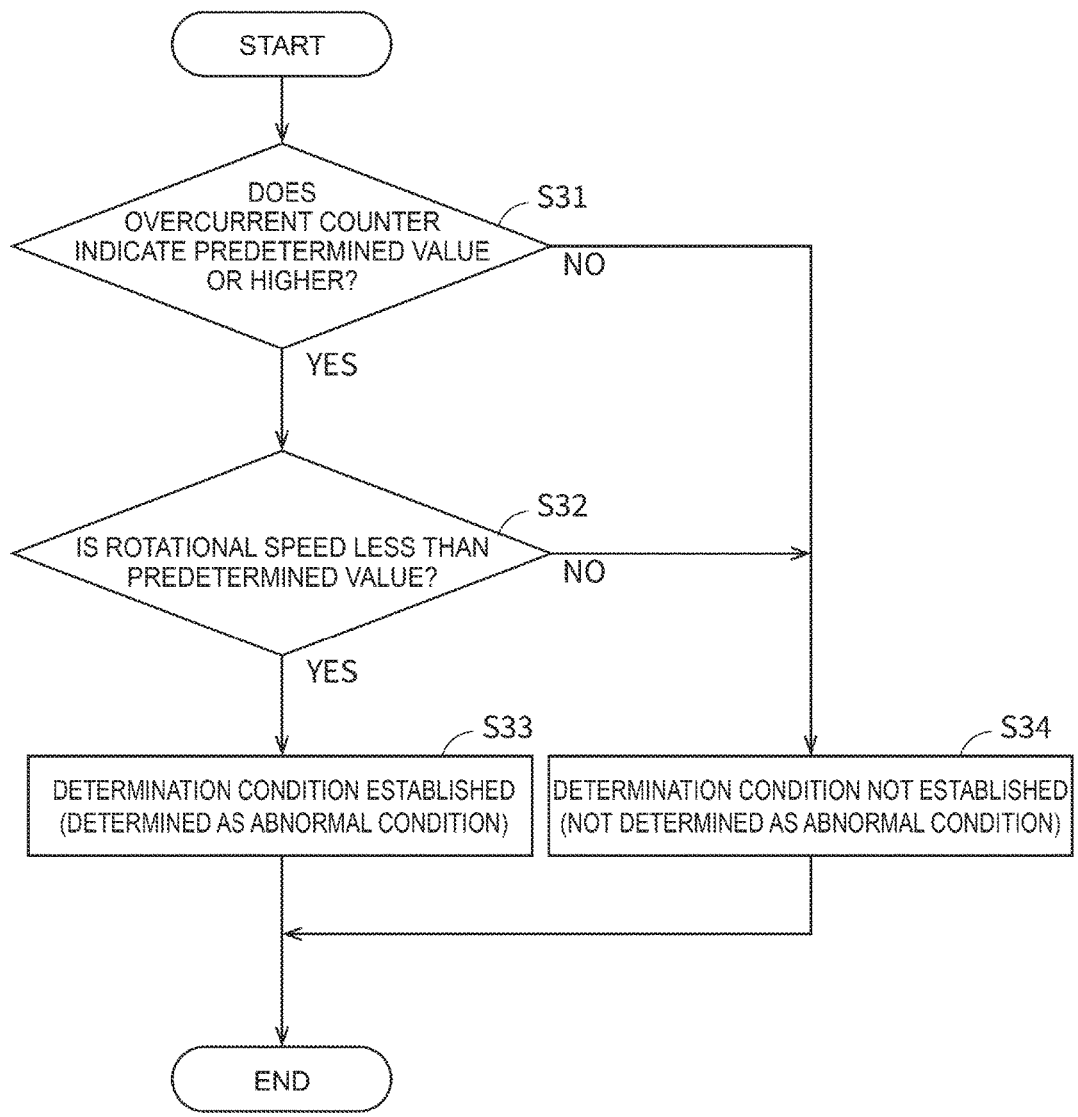
FIG. 3 is a flowchart describing a procedure for determining whether or not a predetermined determination condition is satisfied for a period from a first timing to a second timing.

FIG. 3 is a flowchart describing a procedure for determining whether or not the predetermined determination condition is satisfied for the period from the first timing T1 to the second timing T2.

In step S31, the condition determination section 34 determines whether or not the read value of the overcurrent counter is equal to or greater than a predetermined value (e.g., an integer equal to or greater than 1). When the read value of the overcurrent counter is equal to or greater than the predetermined value, the flow proceeds to step S32.

In step S32, the condition determination section 34 determines whether or not the actual rotational speed is less than a predetermined first rotational speed threshold. When the actual rotational speed is less than the first rotational speed threshold, the flow proceeds to step S33.

In step S33, the condition determination section 34 determines that the determination condition is established. That is, the condition determination section 34 determines that the synchronization motor 10 is in an abnormal condition.

On the other hand, when the overcurrent counter is not equal to or higher than the predetermined value (NO) in step S31, or when the rotational speed is not less than the first rotational speed (NO) in step S32, the condition determination section 34 determines in step S34 that the determination condition is not established. That is, the condition determination section 34 determines that the synchronization motor 10 is not in an abnormal condition.

In this way, the condition determination section 34 determines whether or not the determination condition is satisfied for the period from the first timing T1 to the second timing T2, and the determination is made as step S19 in FIG. 2.

In the present embodiment, the rotational speed control section 33 performs a process of determining a commanded rotational speed in accordance with the actual rotational speed calculated based on the position signal as follows. That is, upon starting the synchronization motor 10, if the actual rotational speed of the synchronization motor 10 is slower than the second rotational speed threshold, the control circuit section 3 determines the commanded rotational speed to be the input commanded rotational speed input to the control circuit section 3. When the actual rotational speed of the synchronization motor 10 is equal to or faster than the second rotational speed threshold, the control circuit section 3 determines the commanded rotational speed to be a set rotational speed set in advance. In the present embodiment, the set rotational speed set in advance is identical to the second rotational speed threshold, but the set commanded rotational speed is not limited to this.

Figure 4:
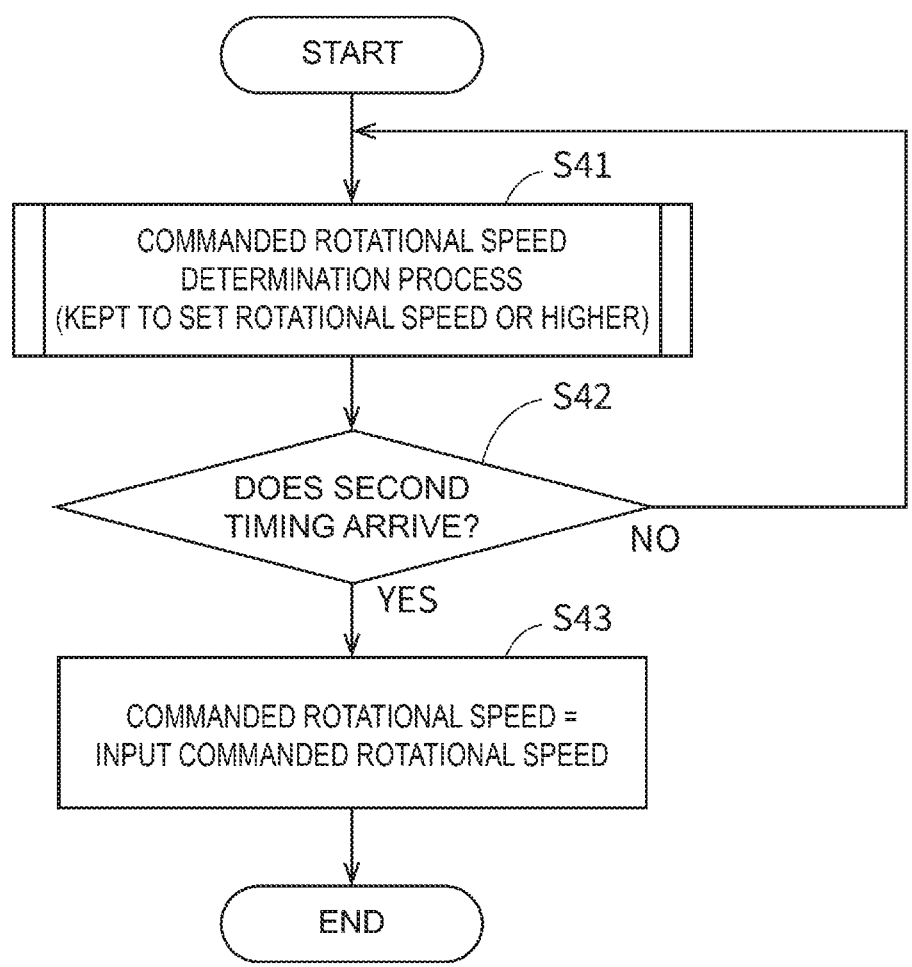
FIG. 4 is a flowchart describing a process of determining a commanded rotational speed.

FIG. 4 is a flowchart describing a process of determining the commanded rotational speed.

As shown in FIG. 4, upon starting the synchronization motor 10, the rotational speed control section 33 performs a commanded rotational speed determination process in step S41. The commanded rotational speed is thereby kept to a speed equal to or faster than the set rotational speed.

Figure 5:
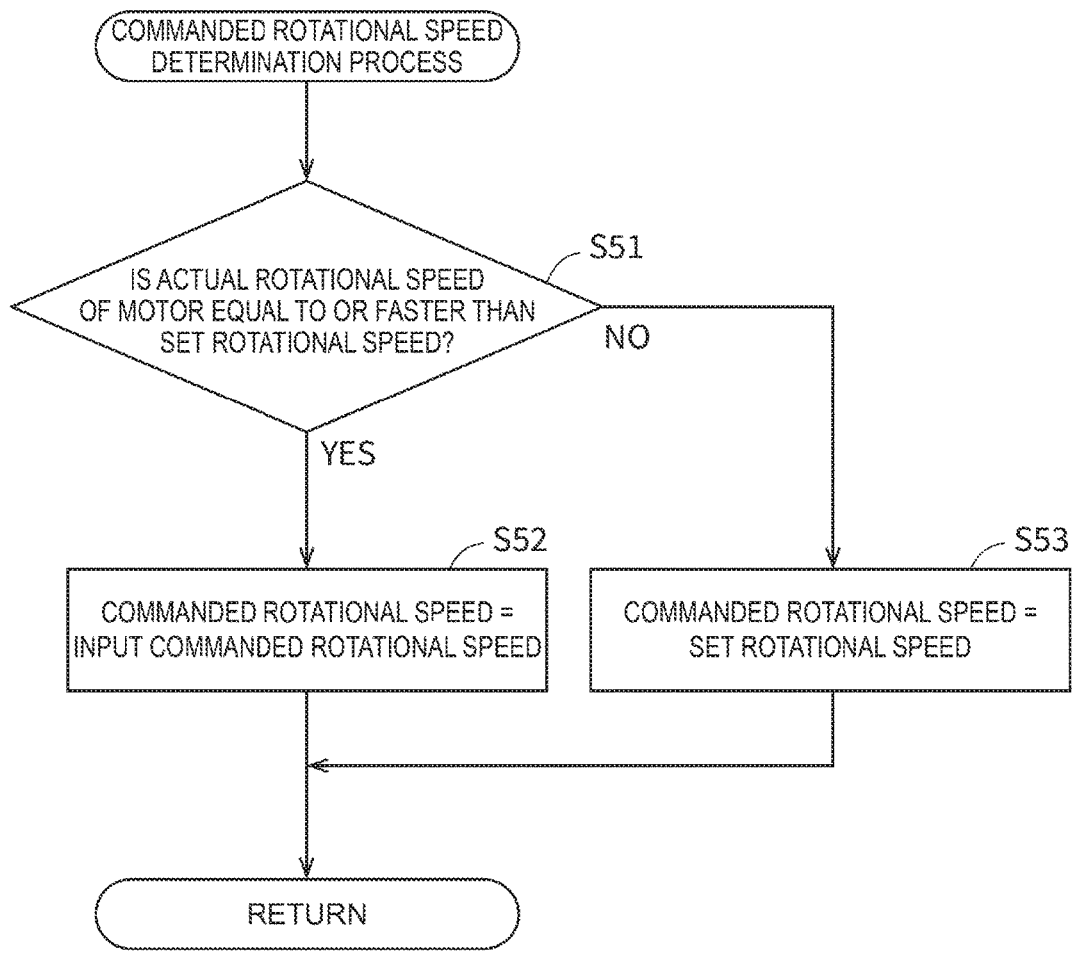
FIG. 5 is a flowchart describing a commanded rotational speed determination process.

FIG. 5 is a flowchart describing the commanded rotational speed determination process.

As shown in FIG. 5, the rotational speed control section 33 determines in step S51 whether or not the actual rotational speed of the synchronization motor 10 is equal to or faster than the second rotational speed threshold (the set rotational speed in the present embodiment).

In step S51, if the actual rotational speed is equal to or a faster than the set rotational speed (YES), the rotational speed control section 33 determines in step S52, the commanded rotational speed to be the input commanded rotational speed Ss input to the control circuit section 3.

On the other hand, in step S51, if the actual rotational speed is not equal to or faster than the set rotational speed (NO), the rotational speed control section 33 determines in step S53, the commanded rotational speed to be the set rotational speed set in advance.

By executing the commanded rotational speed determination process in this way, the commanded rotational speed is kept to the set rotational speed or faster.

Returning to FIG. 4, in step S42, as will be described later, the rotational speed control section 33 determines whether or not the second timing T2 arrives based on the timing information S4 output from the condition determination section 34. If the second timing T2 has not occurred yet (NO), the rotational speed control section 33 executes the process in step S41. When the second timing T2 arrives (YES), the rotational speed control section 33 executes the process in step S43.

In step S43, the rotational speed control section 33 determines the commanded rotational speed to be the input commanded rotational speed Ss input to the control circuit section 3. That is, when the control circuit section 3 does not determine that the synchronization motor 10 is in an abnormal condition at the second timing T2, the control circuit section 3 subsequently determines the commanded rotational speed to be the input commanded rotational speed Ss input to the control circuit section 3 and controls the motor drive section 9.

Figure 6:
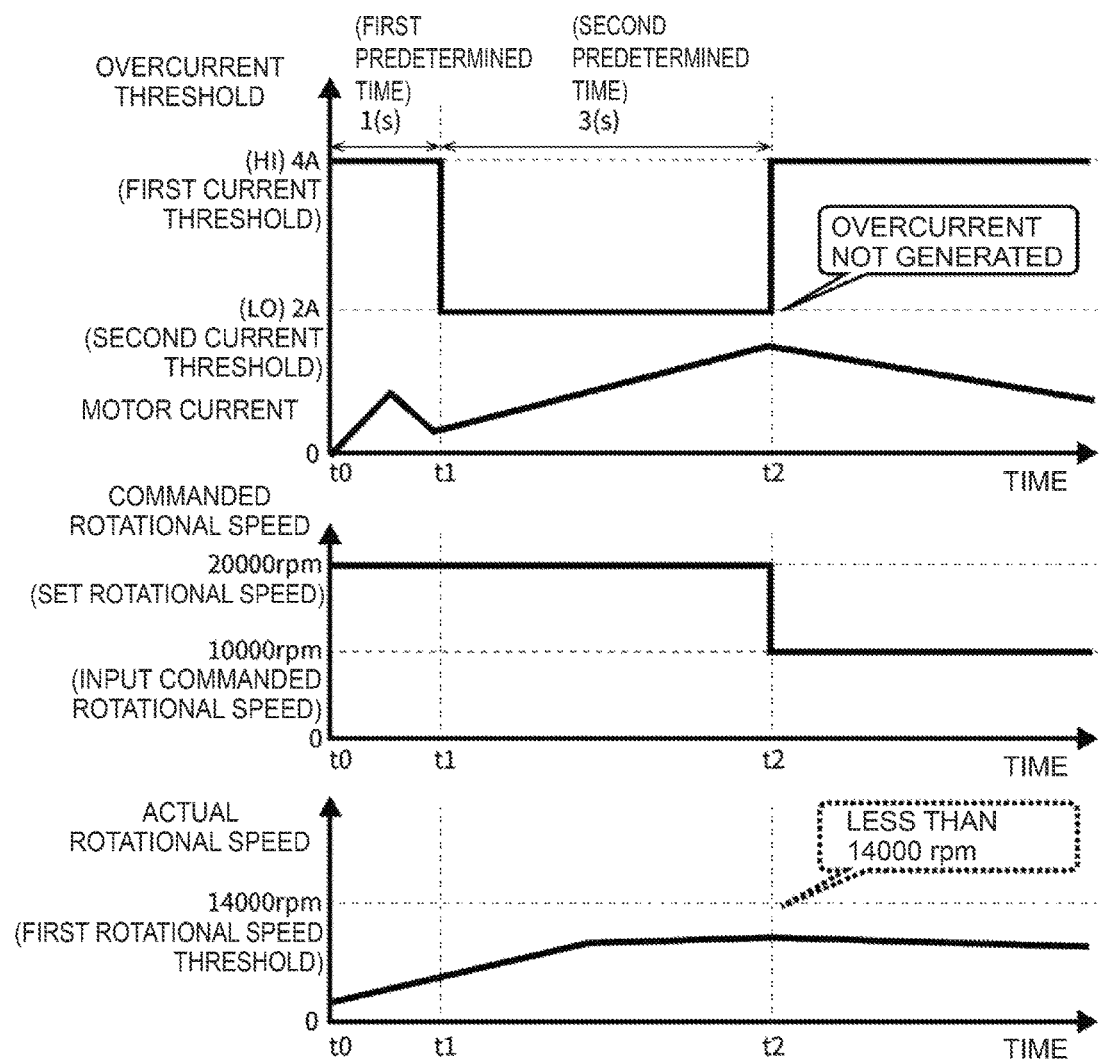
FIG. 6 is a timing chart illustrating a first operation example upon starting of a synchronization motor.

FIG. 6 is a timing chart illustrating a first operation example upon starting the synchronization motor 10.

FIG. 6 and subsequent figures show respective transitions of the overcurrent threshold, the motor current, the commanded rotational speed and the actual rotational speed. Time t0 represents a time of starting the synchronization motor 10. Time t1 represents a first timing T1, that is, a time at which the first predetermined time elapses from time t0. Time t2, that is, a second timing T2, that is, a time at which the second predetermined time elapses from time t1. In the present embodiment, the first predetermined time is, for example, one second and the second predetermined time is, for example, three seconds. The first predetermined time and the second predetermined time are not limited to this, but can be set as appropriate.

In the operation examples shown in FIG. 6 and subsequent figures, the first current threshold is, for example, 4 amperes and the second current threshold is, for example, 2 amperes. The first current threshold is set to such a value as to prevent overheating of the winding or surrounding members or the like of the synchronization motor 10 and prevent damage to the synchronization motor 10. Furthermore, as described above, in the present embodiment, the third current threshold has the same value as the first current threshold. The first rotational speed threshold is, for example, 14000 rpm (rotations/minute). The second rotational speed threshold is, for example, 20000 rpm. The input commanded rotational speed Ss is assumed to be, for example, 10000 rpm. The set rotational speed is assumed to be, for example, 20000 rpm.

Note that the first to third current thresholds and the set rotational speed are not limited to these values and can be set as appropriate. For example, the set rotational speed may be set to not too low a value so that it is possible to accurately determine whether or not the motor is in an abnormal condition for the period from the first timing T1 to the second timing T2, and the second current threshold may be set to such a value as to facilitate determination as an overcurrent when an abnormality occurs.

The first operation example shown in FIG. 6 is an example of a case where the actual rotational speed upon starting is less than the first rotational speed threshold, which is however not determined to be an abnormal condition. When the motor is started at time t0, since the input commanded rotational speed Ss is less than the set rotational speed, the commanded rotational speed is determined to be the set rotational speed. The synchronization motor 10 is energized so as to be rotated at the determined commanded rotational speed and the synchronization motor 10 is accelerated. At time t1, the overcurrent threshold is decreased from the first current threshold to the second current threshold, and it is determined whether or not the motor current reaches the second current threshold. At time t2, the overcurrent threshold is returned from the second current threshold to the first current threshold (an example of the third current threshold). At time t2, the condition determination section 34 determines whether or not the predetermined determination condition is satisfied. In this case, for a period from time t1 to time t2 (time period from the first timing T1 to the second timing T2), the actual rotational speed does not reach the first rotational speed threshold, but no overcurrent occurs. Therefore, it is determined that the determination condition is not established and it is not determined that the motor is in an abnormal condition. Therefore, from time t2 onward, the commanded rotational speed is determined to be the input commanded rotational speed Ss and the synchronization motor 10 is driven.

Figure 7:
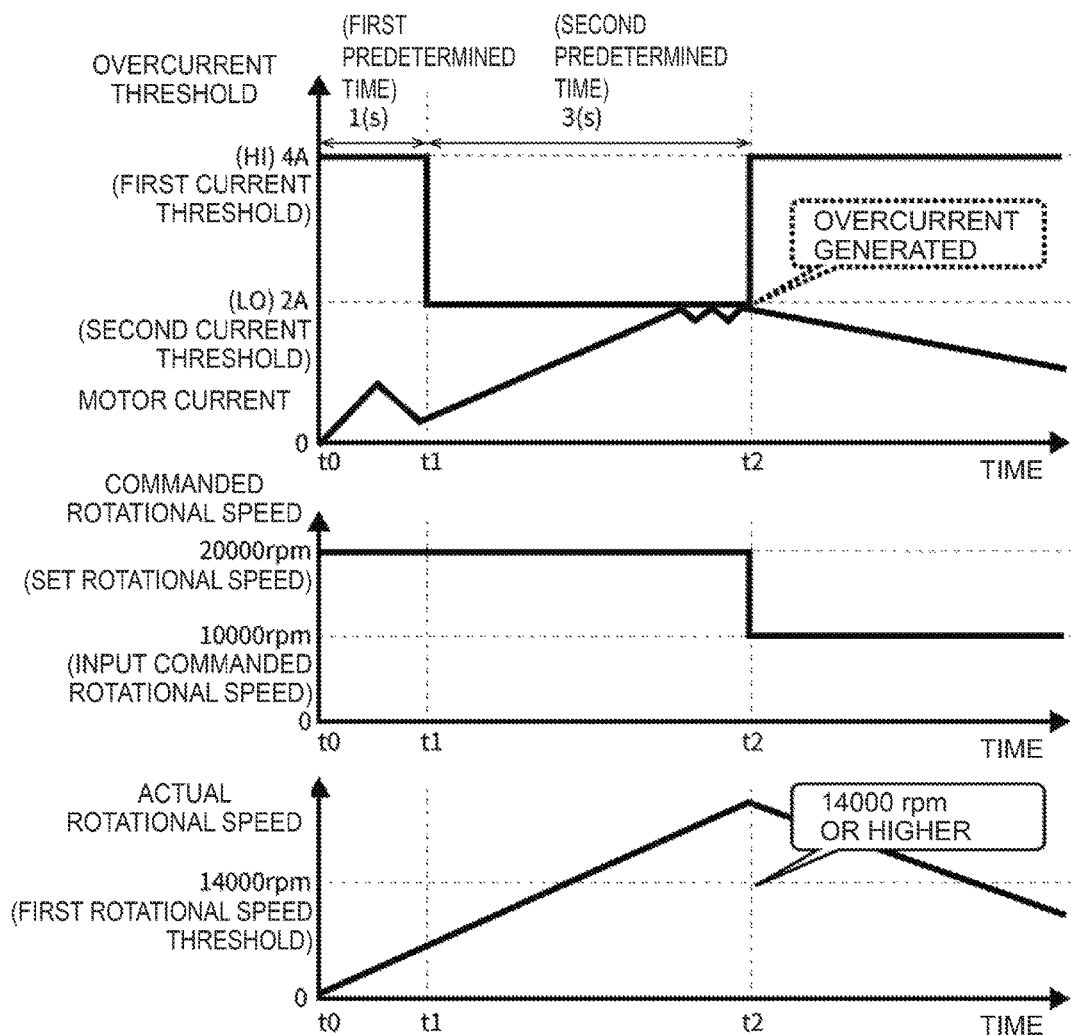
FIG. 7 is a timing chart illustrating a second operation example upon starting of the synchronization motor.

FIG. 7 is a timing chart illustrating a second operation example upon starting the synchronization motor 10.

The second operation example is an example of a case where an overcurrent is generated for the period from the first timing T1 to the second timing T2 upon starting, but it is not determined that the motor is in an abnormal condition. As shown in FIG. 7, upon starting the synchronization motor 10 at time t0, the synchronization motor 10 is energized as in the case of the first operation example and the synchronization motor 10 is accelerated. At time t1, the overcurrent threshold is decreased from the first current threshold to the second current threshold, and it is determined whether or not the motor current reaches the second current threshold. In the second operation example, the motor current reaches the second current threshold before time t2 arrives and the overcurrent counter is incremented. Until time t2 arrives, every time the motor current reaches the second current threshold, energization of the motor current is temporarily stopped, the motor current decreases slightly, and then energization is performed again, and such a process is repeated. Every time the motor current reaches the second current threshold, the overcurrent counter is incremented. When time t2 arrives, the overcurrent threshold is returned from the second current threshold to the first current threshold (an example of the third current threshold). At time t2, the condition determination section 34 determines whether or not the predetermined determination condition is satisfied. In this case, for the period from time t1 to time t2, the actual rotational speed reaches the first rotational speed threshold and exceeds the first rotational speed threshold. Therefore, even when it is determined that the motor is in an overcurrent condition, it is determined that the determination condition is not established, and it is not determined that the motor is in an abnormal condition. Therefore, from time t2 onward, the commanded rotational speed is determined to be the input commanded rotational speed Ss and the synchronization motor 10 is driven.

Figure 8:
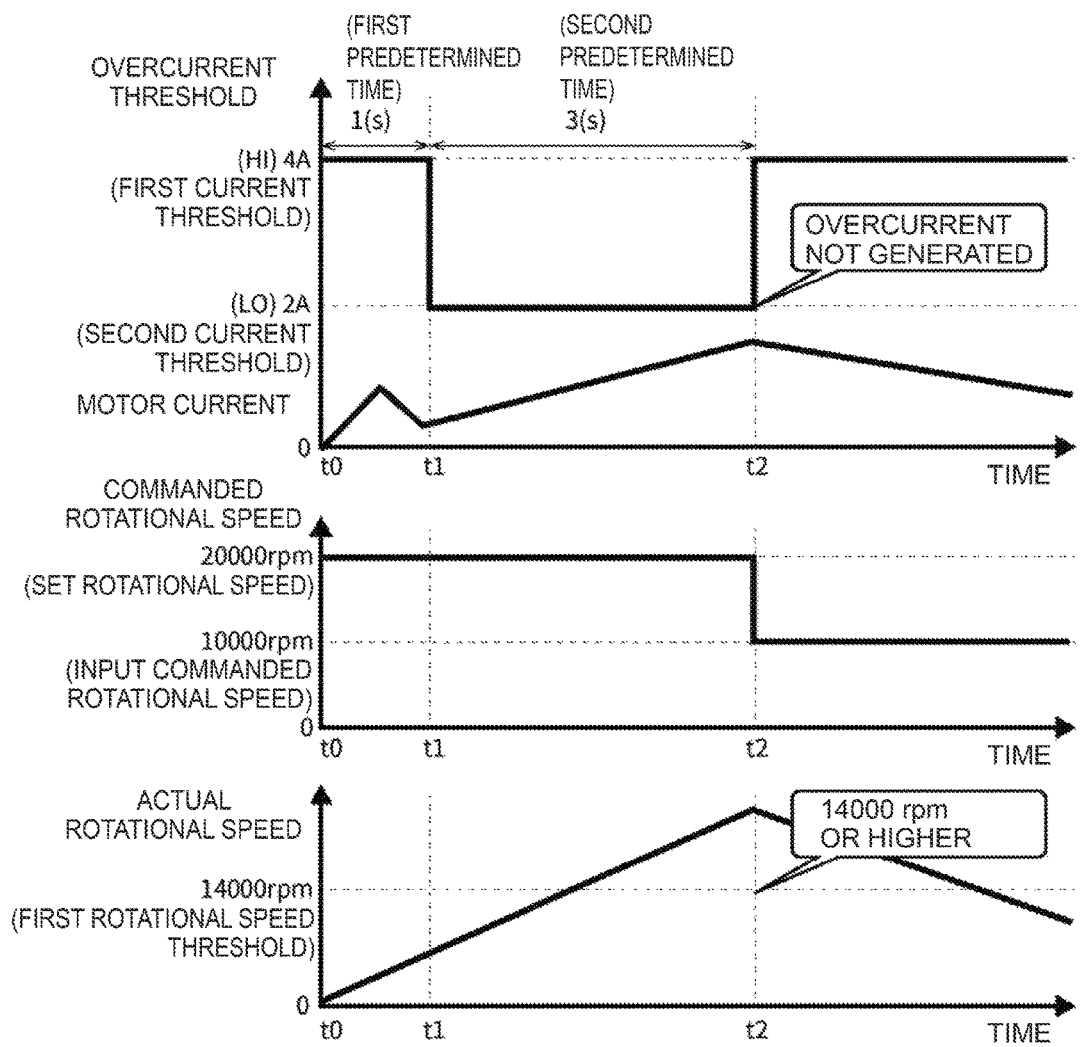
FIG. 8 is a timing chart illustrating a third operation example upon starting of the synchronization motor.

FIG. 8 is a timing chart illustrating a third operation example upon starting the synchronization motor 10.

The third operation example is an example of a case where no overcurrent is generated for the period from the first timing T1 to the second timing T2 upon starting, the actual rotational speed reaches the first rotational speed threshold and it is not determined that the motor is in an abnormal condition. As shown in FIG. 8, when the synchronization motor 10 is started at time t0, the synchronization motor 10 is energized as in the case of the first operation example and the synchronization motor 10 is accelerated. At time t1, the overcurrent threshold is decreased from the first current threshold to the second current threshold, and it is determined whether or not the motor current reaches the second current threshold. When time t2 arrives, the overcurrent threshold is returned from the second current threshold to the first current threshold (an example of the third current threshold). At time t2, the condition determination section 34 determines whether or not the predetermined determination condition is satisfied. In this case, for the period from time t1 to time t2, no overcurrent is generated. For the period from time t1 to time t2, the actual rotational speed reaches the first rotational speed threshold and exceeds the first rotational speed threshold. Therefore, it is determined that the determination condition is not established and it is not determined that the motor is in an abnormal condition. Therefore, from time t2 onward, the commanded rotational speed is determined to be the input commanded rotational speed Ss and the synchronization motor 10 is driven.

Figure 9:
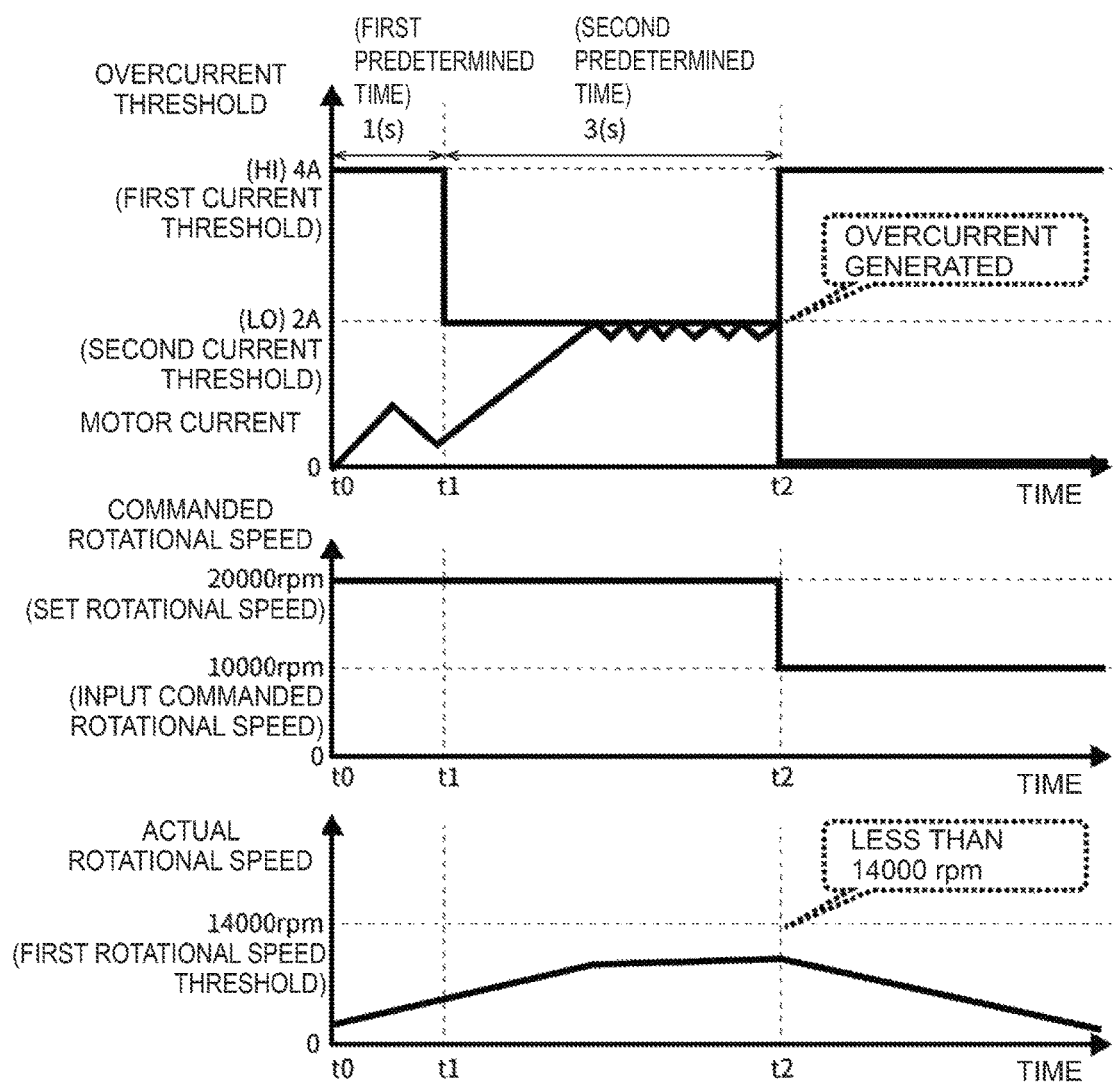
FIG. 9 is a timing chart illustrating a fourth operation example upon starting of the synchronization motor.

FIG. 9 is a timing chart illustrating a fourth operation example upon starting the synchronization motor 10.

The fourth operation example is an example of a case where an overcurrent is generated a predetermined number of times or more for the period from the first timing T1 to second timing T2 upon starting, the actual rotational speed does not reach the first rotational speed threshold, and it is determined that the motor is in an abnormal condition. As shown in FIG. 9, when the synchronization motor 10 is started at time t0, the synchronization motor 10 is energized as in the case of the first operation example and the synchronization motor 10 is accelerated. At time t1, the overcurrent threshold is decreased from the first current threshold to the second current threshold, and it is determined whether or not the motor current reaches the second current threshold. In the fourth operation example, as in the case of the second operation example, the motor current reaches the second current threshold before time t2 arrives, and the overcurrent counter is incremented every time the motor current reaches the second current threshold. When time t2 arrives, the overcurrent threshold is returned from the second current threshold to the first current threshold (an example of the third current threshold). At time t2, the condition determination section 34 determines whether or not the predetermined determination condition is satisfied. In this case, an overcurrent is generated a predetermined number of times or more for the period from time t1 to time t2, and it is determined that the motor is in an overcurrent condition. Furthermore, the actual rotational speed does not reach the first rotational speed threshold for the period from time t1 to time t2. Therefore, it is determined that the determination condition is established, and it is determined that the motor is in an abnormal condition. Therefore, from time t2 onward, no energization is performed and the motor current becomes zero. The synchronization motor 10 is decelerated and then stopped.

As described so far, in the present embodiment, it is possible to accurately detect an abnormal condition including a reverse rotation condition and a hunting condition upon starting the synchronization motor 10.

For the period from the first timing T1 to the second timing T2 for determining an overcurrent condition, the overcurrent threshold is changed from the normal first current threshold to the second current threshold lower than the first current threshold. Therefore, it is possible to reliably detect that an overcurrent condition is generated due to an abnormal condition that is different from a normal condition.

The first predetermined period is provided before the first timing T1 at which a period for determining an abnormal condition is started. The first predetermined period is set so that even when a current variation (overshoot or the like) immediately after starting of energization to the synchronization motor 10 occurs, the current variation may converge within this period. Therefore, even when a current variation occurs immediately after the energization to the synchronization motor 10 starts, the variation has no effect for the period of determination of an abnormal condition from the first timing T1 to the second timing T2, and it is possible to accurately determine whether or not the motor is in an abnormal condition in a stable manner.

When the number of times the first current threshold is reached reaches or exceeds a predetermined number of times within the second predetermined time, that is, the period from the first timing T1 to the second timing T2 (an example of the predetermined period), it is determined that the motor is in an overcurrent condition, and the abnormal condition is less influenced by noise or temporary external disturbance or the like and is therefore highly accurately determined.

Since the predetermined determination condition for determining whether or not the motor is in an abnormal condition includes whether or not the actual rotational speed is less than the first rotational speed threshold, it is possible to increase the determination accuracy. When, for example, the synchronization motor 10 is rotating in reverse upon starting, since the actual rotational speed does not reach or exceed the first rotational speed threshold, it is possible to determine this as an abnormal condition. Furthermore, when the synchronization motor 10 is in a hunting condition, it is more likely to be determined that the synchronization motor 10 is in an overcurrent condition and the actual rotational speed does not increase and does not reach or exceed the first rotational speed threshold. Therefore, such a condition can be determined to be an abnormal condition.

It is not necessary to monitor the coil voltage in order to determine whether the synchronization motor 10 is rotating normally or in reverse and therefore, it is not necessary to add a circuit for that purpose. Therefore, it is possible to reduce the sizes of the motor drive control device 1 and the synchronization motor 10 or reduce the number of parts.

In the present embodiment, when the actual rotational speed upon starting is equal to or faster than the second rotational speed threshold, the commanded rotational speed is set to a high set rotational speed equal to or faster than the second rotational speed threshold. For this reason, if the synchronization motor 10 is rotated in reverse, a load greater than a normal load is placed on the synchronization motor 10, causing a greater current to flow. In that case, particularly for the period from the first timing T1 to the second timing T2, which is a predetermined period, it is more likely to be determined that the synchronization motor 10 is in an overcurrent condition, and therefore, it is possible to easily and speedily detect that the synchronization motor 10 is in an abnormal condition. When the synchronization motor 10 is rotating normally upon starting, the load is so small that it is not subject to overcurrent restrictions.

[Others]

The motor drive control device is not limited to the circuit configuration shown in the above-described embodiments or modifications. Various circuit configurations configured to achieve the object of the present disclosure can be applied.

Figure 10:
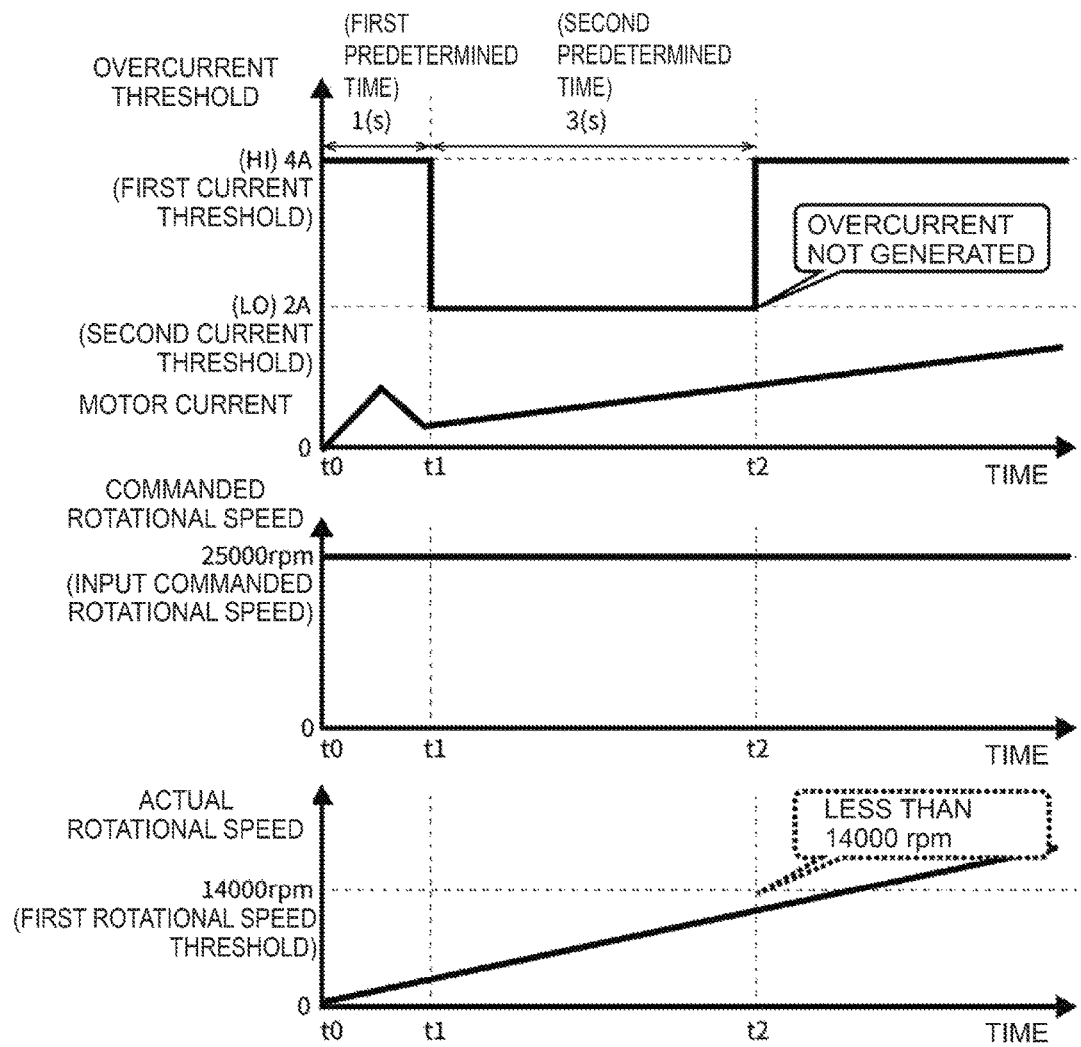
FIG. 10 is a timing chart illustrating a fifth operation example upon starting of the synchronization motor.

FIG. 10 is a timing chart illustrating a fifth operation example upon starting the synchronization motor 10.

Note that in the commanded rotational speed determination process, the commanded rotational speed may always be determined to be the input commanded rotational speed Ss. In this case, when the input commanded rotational speed Ss is high (25000 rpm in the present example), the commanded rotational speed may not be particularly changed to the set rotational speed but may be determined to be the input commanded rotational speed. As shown in FIG. 10, also in this case, when the actual rotational speed does not reach the first rotational speed threshold for the period from time t1 to time t2 and it is not determined that the synchronization motor 10 is in an overcurrent condition, it is not determined that the synchronization motor 10 is in an abnormal condition. Therefore, from time t2 onward, the commanded rotational speed is determined to be the input commanded rotational speed Ss and the synchronization motor 10 is driven.

Furthermore, as another modification, generations of overcurrent may be counted a predetermined number of times for a second predetermined period (period until the second timing T2 arrives) and it may be determined whether or not the synchronization motor 10 is in an abnormal condition when an overcurrent condition is established. At this time, the first rotational speed threshold may be set to a lower rotational speed than when a determination is made after the second timing T2 arrives and whether or not the actual rotational speed at that point in time is equal to or faster than the first rotational speed threshold may be determined.

Furthermore, the phases for which position detectors are arranged are not limited. The motor driven by the motor drive control device according to the present embodiment is not limited to the three-phase brushless motor, but may be various motors equipped with coils with a plurality of phases such as two or more phases. A motor, a rotational speed of which is detected using, for example, an FG sensor may also be a target of drive control by the motor drive control device according to the present embodiment.

Whether or not the motor is in an abnormal condition may be the only predetermined determination condition to determine whether or not the motor is in an overcurrent condition. Alternatively, other conditions may also be added.

Whether or not the motor is in an overcurrent condition may be determined by combining count up and count down of the number of times overcurrent is generated.

The above-described flowcharts or the like illustrate examples to describe operations but the present disclosure is not limited to these flowcharts. Steps shown in the respective drawings of the flowcharts are specific examples but the present disclosure is not limited to these flows, and the order of the respective steps may be changed, or another process may be inserted between the respective steps or processes may be executed in parallel.

Some or all of the processes in the above-described embodiment may be implemented by software or using a hardware circuit. For example, the control circuit section is not limited to a microcontroller. As for an internal configuration of the control circuit section, at least part of the configuration may be processed by software.

It should be noted that all the aspects of the above-described embodiment are exemplary, but are not restrictive. The scope of the present disclosure is indicated not by the foregoing description but by the scope of claims, and all the changes in the meaning and within a scope equivalent to the scope of claims are meant to be included.

What is claimed is:

1. A motor drive control device comprising:
a motor drive section selectively energizing coils with a plurality of phases of a motor;
a control circuit section outputting a drive control signal generated based on an internally determined commanded rotational speed to the motor drive section to control operation of the motor drive section; and
a position detector corresponding to any one of the plurality of phases and outputting a position signal, a phase of the position signal changing in correspondence with a position of a rotor of the motor, wherein
when the motor is started, the control circuit section determines the commanded rotational speed in accordance with an actual rotational speed calculated based on the position signal,
the control circuit section determines whether or not the motor is in an abnormal condition based on a predetermined determination condition for a predetermined period,
upon determining that the motor is in the abnormal condition, the control circuit section outputs the drive control signal to the motor drive section to stop the motor,
the abnormal condition includes a reversely rotating state, in the reversely rotating state the motor rotating in a direction opposite to a rotating direction when the motor is successfully started,
the predetermined determination condition includes the motor being in an overcurrent condition,
the control circuit section determines whether or not the motor is in an overcurrent condition based on a comparison result between a current flowing through the motor and a first current threshold after the motor is started and before a first timing when a first predetermined time elapses, and
the control circuit section determines whether or not the motor is in an overcurrent condition based on a comparison result between a current flowing through the motor and a second current threshold smaller than the first current threshold after the first timing.

2. The motor drive control device according to claim 1, wherein the predetermined period is a period from the first timing to a second timing, and the control circuit section determines whether or not the motor is in an overcurrent condition based on the comparison result between the current flowing through the motor and the second current threshold for the predetermined period.

3. The motor drive control device according to claim 2, wherein the control circuit section determines whether or not the motor is in an overcurrent condition based on the number of times the current flowing through the motor reaches the second current threshold for the predetermined period.

4. The motor drive control device according to claim 3, wherein the control circuit section determines whether or not the motor is in an overcurrent condition based on a comparison result between a current flowing through the motor and a third current threshold greater than the second current threshold after the second timing.

5. The motor drive control device according to claim 1, wherein the abnormal condition includes a hunting condition.

6. A motor drive control device comprising:
a motor drive section selectively energizing coils with a plurality of phases of a motor;
a control circuit section outputting a drive control signal generated based on an internally determined commanded rotational speed to the motor drive section to control operation of the motor drive section; and
a position detector corresponding to any one of the plurality of phases and outputting a position signal, a phase of the position signal changing in correspondence with a position of a rotor of the motor, wherein
when the motor is started, the control circuit section determines the commanded rotational speed in accordance with an actual rotational speed calculated based on the position signal,
the control circuit section determines whether or not the motor is in an abnormal condition based on a predetermined determination condition for a predetermined period,
upon determining that the motor is in the abnormal condition, the control circuit section outputs the drive control signal to the motor drive section to stop the motor,
the abnormal condition includes a reversely rotating state, in the reversely rotating state the motor rotating in a direction opposite to a rotating direction when the motor is successfully started, and
the predetermined determination condition includes whether or not the actual rotational speed is less than a first rotational speed threshold for the predetermined period.

7. A motor drive control device comprising:
a motor drive section selectively energizing coils with a plurality of phases of a motor;
a control circuit section outputting a drive control signal generated based on an internally determined commanded rotational speed to the motor drive section to control operation of the motor drive section; and
a position detector corresponding to any one of the plurality of phases and outputting a position signal, a phase of the position signal changing in correspondence with a position of a rotor of the motor, wherein
when the motor is started, the control circuit section determines the commanded rotational speed in accordance with an actual rotational speed calculated based on the position signal,
the control circuit section determines whether or not the motor is in an abnormal condition based on a predetermined determination condition for a predetermined period,
upon determining that the motor is in the abnormal condition, the control circuit section outputs the drive control signal to the motor drive section to stop the motor,
the abnormal condition includes a reversely rotating state, in the reversely rotating state the motor rotating in a direction opposite to a rotating direction when the motor is successfully started,
when the motor is started, the control circuit section determines the commanded rotational speed to be an input commanded rotational speed input to the control circuit section when the actual rotational speed is slower than a second rotational speed threshold, and the control circuit section determines the commanded rotational speed to be a set rotational speed which is set in advance when the actual rotational speed is equal to or faster than the second rotational speed threshold.

8. A motor drive control device comprising:

a motor drive section selectively energizing coils with a plurality of phases of a motor;

a control circuit section outputting a drive control signal generated based on an internally determined commanded rotational speed to the motor drive section to control operation of the motor drive section; and a position detector corresponding to any one of the plurality of phases and outputting a position signal, a phase of the position signal changing in correspondence with a position of a rotor of the motor, wherein when the motor is started, the control circuit section determines the commanded rotational speed in accordance with an actual rotational speed calculated based on the position signal, the control circuit section determines whether or not the motor is in an abnormal condition based on a predetermined determination condition for a predetermined period, upon determining that the motor is in the abnormal condition, the control circuit section outputs the drive control signal to the motor drive section to stop the motor, the abnormal condition includes a reversely rotating state, in the reversely rotating state the motor rotating in a direction opposite to a rotating direction when the motor is successfully started, and when the control circuit section does not determine that the motor is in an abnormal condition, the control circuit section determines the commanded rotational speed to be the input commanded rotational speed input to the control circuit section to control the motor drive section.

* * * * *